US011783287B2

(12) United States Patent
Chritz et al.

(10) Patent No.: US 11,783,287 B2
(45) Date of Patent: Oct. 10, 2023

(54) METHODS AND APPARATUSES FOR DETERMINING REAL-TIME LOCATION INFORMATION OF RFID DEVICES

(71) Applicant: MICRON TECHNOLOGY, INC., Boise, ID (US)

(72) Inventors: Jeremy Chritz, Seattle, WA (US); John Schroeter, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 196 days.

(21) Appl. No.: 17/339,537

(22) Filed: Jun. 4, 2021

(65) Prior Publication Data

US 2021/0295250 A1    Sep. 23, 2021

Related U.S. Application Data

(62) Division of application No. 15/447,893, filed on Mar. 2, 2017, now Pat. No. 11,055,657.

(51) Int. Cl.
*H04W 4/80* (2018.01)
*G06Q 10/087* (2023.01)
(Continued)

(52) U.S. Cl.
CPC .............. *G06Q 10/087* (2013.01); *G06F 3/06* (2013.01); *H04W 4/02* (2013.01); *H04W 4/80* (2018.02); *G06F 3/067* (2013.01); *H04L 67/10* (2013.01)

(58) Field of Classification Search
CPC ........ G06Q 10/087; H04W 4/80; H04W 4/02; G06F 3/06; G06F 3/067; H04L 67/10
(Continued)

(56) References Cited

U.S. PATENT DOCUMENTS 7,477,917 B2    1/2009 Rofougaran et al.
7,606,530 B1    10/2009 Anderson et al.
(Continued)

FOREIGN PATENT DOCUMENTS

CN    101889778 A    11/2010
CN    101938756 A    1/2011
(Continued)

OTHER PUBLICATIONS

CN Office Action and English translation for 201880015233.5, dated Aug. 30, 2022; pp. all.
(Continued)

*Primary Examiner* — April G Gonzales
(74) *Attorney, Agent, or Firm* — Dorsey & Whitney LLP (57) ABSTRACT

An apparatus is described. The apparatus includes an antenna array configured to detect one or more radio frequency signals from one or more radio emitters and an integrated circuit chip coupled to the array of antennas. The integrated circuit chip comprises a first plurality of processing elements configured to determine a location of the one or more emitters based on the one or more radio frequency signals and a second plurality of processing elements configured to process the location information for communication via a cellular network. The apparatus further includes an antenna coupled to the second plurality of processing elements and configured to communicate the processed location information via a cellular network.

18 Claims, 6 Drawing Sheets

(51) Int. Cl.
*H04W 4/02* (2018.01)
*G06F 3/06* (2006.01)
*H04L 67/10* (2022.01)

(58) Field of Classification Search
USPC ........................................................ 455/41.1
See application file for complete search history.

(56) References Cited

U.S. PATENT DOCUMENTS

| | | | |
|---|---|---|---|
| 7,948,371 | B2 | 5/2011 | Muirhead |
| 8,436,674 | B1 | 5/2013 | Standley et al. |
| 8,472,372 | B1* | 6/2013 | Dulai ................. H04W 84/105 358/1.15 |
| 8,811,422 | B2 | 8/2014 | Georgiou et al. |
| 9,100,789 | B2* | 8/2015 | Moeller ............... H04W 4/021 |
| 9,396,424 | B1 | 7/2016 | Loman et al. |
| 9,461,673 | B2* | 10/2016 | Hassan ................. H01Q 21/30 |
| 10,075,392 | B1 | 9/2018 | Chritz et al. |
| 10,958,593 | B2 | 3/2021 | Chritz et al. |
| 11,055,657 | B2* | 7/2021 | Chritz ..................... H04W 4/02 |
| 11,575,548 | B2* | 2/2023 | Luo ................. H04L 25/03866 |
| 2003/0120745 | A1 | 6/2003 | Katagishi et al. |
| 2005/0113035 | A1 | 5/2005 | Kyongyop |
| 2005/0216700 | A1 | 9/2005 | Honary et al. |
| 2006/0268777 | A1 | 11/2006 | Schmidt |
| 2006/0273907 | A1* | 12/2006 | Heiman ............. G06K 7/10336 446/454 |
| 2007/0030124 | A1 | 2/2007 | Lee |
| 2007/0207744 | A1 | 9/2007 | Rofougaran et al. |
| 2008/0143482 | A1 | 6/2008 | Shoarinejad et al. |
| 2008/0285633 | A1 | 11/2008 | Rofougaran |
| 2008/0309490 | A1 | 12/2008 | Honkanen et al. |
| 2009/0221232 | A1 | 9/2009 | Estevez et al. |
| 2010/0026461 | A1 | 2/2010 | Merchan et al. |
| 2010/0123561 | A1 | 5/2010 | Nam et al. |
| 2012/0135681 | A1 | 5/2012 | Adams et al. |
| 2013/0051284 | A1 | 2/2013 | Khlat |
| 2013/0089102 | A1* | 4/2013 | Seo ..................... G06F 9/44505 370/401 |
| 2013/0324056 | A1 | 12/2013 | Maguire |
| 2014/0237227 | A1* | 8/2014 | Aizawa ............... G06F 15/7867 713/100 |
| 2014/0244395 | A1 | 8/2014 | Case, Jr. |
| 2014/0269547 | A1* | 9/2014 | Valliappan ............ H04W 16/02 370/329 |
| 2014/0269650 | A1 | 9/2014 | Sahota |
| 2014/0306808 | A1* | 10/2014 | Jones ................. G06K 7/10356 340/10.4 |
| 2014/0361077 | A1* | 12/2014 | Davidson ............. G06Q 10/087 235/385 |
| 2015/0304000 | A1 | 10/2015 | Wloczysiak |
| 2015/0363856 | A1 | 12/2015 | Rinicella |
| 2016/0072731 | A1 | 3/2016 | Martin et al. |
| 2016/0086484 | A1 | 3/2016 | Feher |
| 2016/0127015 | A1* | 5/2016 | Wloczysiak ............. H04B 7/08 375/219 |
| 2016/0150459 | A1 | 5/2016 | Patil et al. |
| 2016/0210483 | A1 | 7/2016 | Glaser |
| 2016/0227598 | A1 | 8/2016 | Singh et al. |
| 2017/0018006 | A1* | 1/2017 | Walden ............... G06Q 30/0259 |
| 2017/0165147 | A1* | 6/2017 | Ng ......................... A61H 3/061 |
| 2017/0228776 | A1* | 8/2017 | Walden ............... G06Q 30/0261 |
| 2018/0253679 | A1 | 9/2018 | Chritz et al. |
| 2018/0255001 | A1 | 9/2018 | Chritz et al. |
| 2019/0020596 | A1 | 1/2019 | Chritz et al. |
| 2021/0160195 | A1 | 5/2021 | Chritz et al. |

FOREIGN PATENT DOCUMENTS

| | | |
|---|---|---|
| CN | 202351906 U | 7/2012 |
| CN | 105048091 A | 11/2015 |
| JP | 2010037104 A | 2/2010 |
| JP | 2010052915 A | 3/2010 |
| KR | 20060036434 A | 4/2006 |
| KR | 10067748181 B1 | 2/2007 |
| KR | 20080035955 A | 4/2008 |
| KR | 20110134707 A | 12/2011 |
| KR | 20160120333 A | 10/2016 |
| WO | 0106401 A1 | 1/2001 |
| WO | 2007060494 A1 | 5/2007 |
| WO | 2012162172 A1 | 11/2012 |
| WO | 2018160390 A1 | 9/2018 |
| WO | 2018160393 A1 | 9/2018 |

OTHER PUBLICATIONS

CN Office Action dated May 30, 2022 for CN Application No. 201880015233.5, pp. all.
English translation of Office Action for CN Application No. 201880015233.5, dated Sep. 10, 2021.
"General Packet Radio Service" retrieved from Wikipedia on Dec. 7, 2022; pp. all https://en. wikipedia. org/w/ind ex. php?title=General_Packet_Radio _ Service&old id =94238314.
CN Office Action dated Mar. 8, 2021 for CN Application No. 201880015233.5, pp. all.
CN Office Action dated Sep. 2, 2020 for CN Application No. 201880015233.5, pp. all.
EESR dated Dec. 11, 2020 for EP Application No. 18761066.2, pp. all.
International Search Report and Written Opinion received for PCT Application No. PCT/US2018/018767, dated Jun. 1, 2018, pp. all.
KR Office Action dated Jul. 29, 2020 for KR Application No. 10-2019-7028271, pp. all.
Machine Translation of JP 2010052915, Mar. 2010, pp. all.
U.S. Appl. No. 15/447,867 entitled "Methods and Apparatuses for Processing Multiple Communications Signals With a Single Integrated Circuit Chip", filed Mar. 2, 2017, pp. all.
U.S. Appl. No. 15/447,893 entitled "Methods and Apparatuses for Determining Real-Time Location Information of RFID Devices", filed Mar. 2, 2017, pp. all.

* cited by examiner

METHODS AND APPARATUSES FOR DETERMINING REAL-TIME LOCATION INFORMATION OF RFID DEVICES

CROSS REFERENCE TO RELATED APPLICATION(S)

This application is a divisional of U.S. patent application Ser. No. 15/447,893 filed Mar. 2, 2017 and issued as U.S. Pat. No. 11,055,657 on Jul. 6, 2021. The aforementioned application, and issued patent, is incorporated herein by reference, in its entirety, for any purpose.

BACKGROUND

Many traditional systems for determining real-time location information of wireless devices require complex systems embedded in the device to be located. For example, accelerometers or global positioning systems are typically used to determine the locations of devices. Such systems are electronically complex, expensive, consume significant power, and are often fragile. There is a need for an inexpensive mechanism to determine the locations of objects.

Radio frequency identification (RFID) systems tags typically contain at least two parts: an integrated circuit for storing and processing information, modulating and demodulating a radio-frequency (RF) signal, collecting DC power from the incident reader signal, and other specialized functions; and an antenna for receiving and transmitting the signal. The tag information is typically stored in a non-volatile memory. The RFID tag includes either fixed or programmable logic for processing the transmission and sensor data, respectively.

An RFID reader may transmit an encoded radio signal to interrogate the tag or passively receive a signal from the RFID tag. The RFID tag receives the message and then responds with its identification and other information. This may be only a unique tag serial number, or may be product-related information such as a stock number, lot or batch number, production date, or other specific information. Since tags have individual serial numbers, the RFID system design can discriminate among several tags that might be within the range of the RFID reader and read them simultaneously.

DETAILED DESCRIPTION

Figure 1:
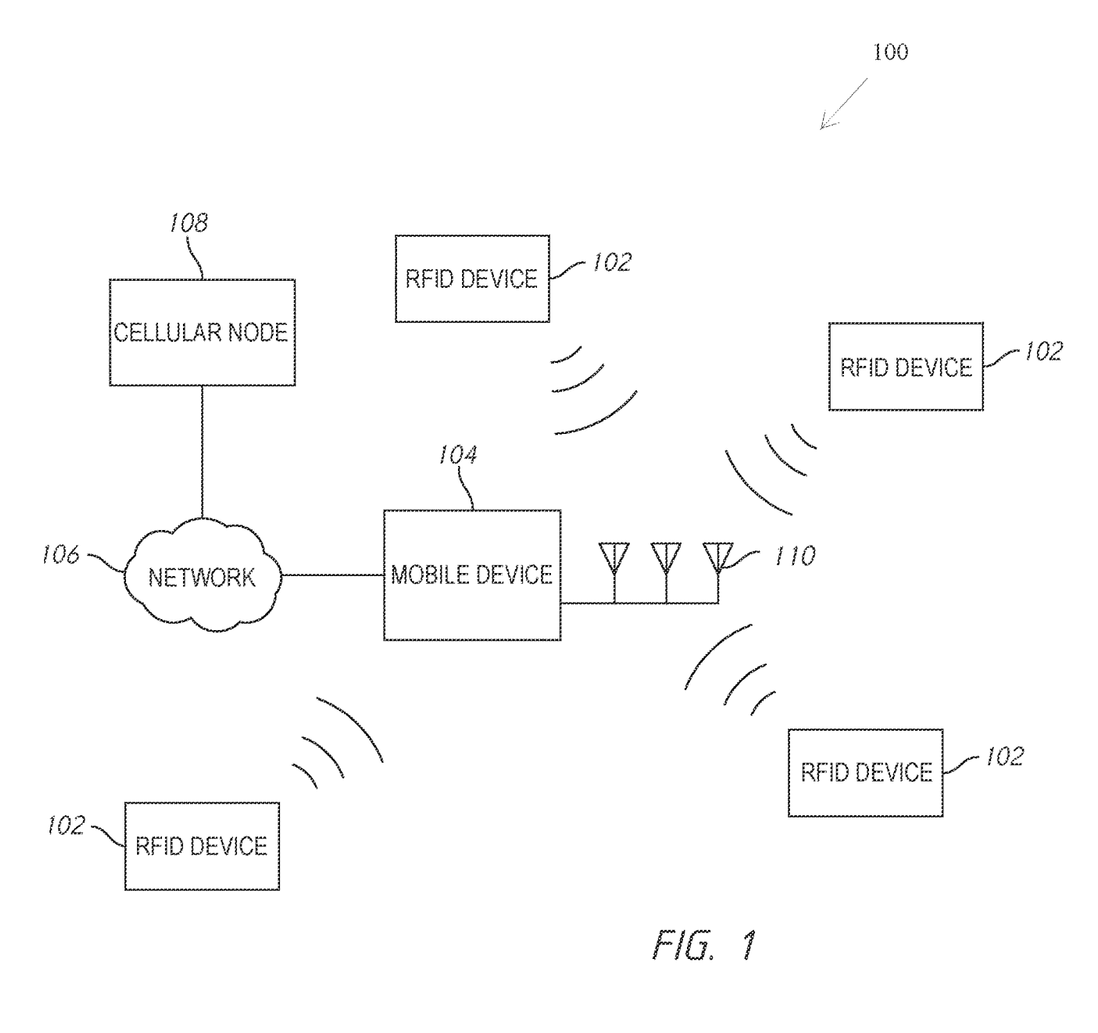
FIG. 1 is a block diagram of a wireless communication system, in accordance with an embodiment of the present invention.

FIG. 1 is a block diagram of a wireless communication system, generally designated 100, in accordance with an embodiment of the present invention. The communication system 100 includes a plurality of RFID devices 102, a mobile device 104, and a cellular node 108 connected to the mobile device 104 via a network 106. The network 106 may generally be any type of communications network. The network 106 may be a wired network, a wireless network, or a combination thereof. For example, the network 106 may be a cellular network, such as 3G, 4G, or 5G. In other embodiments, the network 106 may be a Wi-Fi network. The network 106 may be a local area network or a wide area network.

The plurality of RFID devices 102 may be any type of device that emits an RFID signal. For example, the RFID devices 102 may be, for example, RFID tags or labels. The RFID devices 102 may be passive, active, or battery assisted passive. An active tag may have an on-board battery and periodically transmits its ID signal. A battery-assisted passive tag may have a small battery on board and is activated when in the presence of an RFID reader. A passive tag may be cheaper and smaller because it may not have a battery. Instead, the passive tag may use the radio energy transmitted by the reader to operate a passive tag. The RFID devices 102 may include one or more antennas for transmitting its ID signal as a radio frequency signal.

The mobile device 104 may detect the ID signals of one or more of the RFID devices 102, determine the location information of the RFID devices 102, and transmit the location information. The mobile device 104 may be, for example, a smartphone, a laptop computer, or a tablet computer. The mobile device 104 may include a reconfigurable fabric of processors that are dynamically configurable to receive the ID signals from the RFID devices 102, process the received signals to determine the relative locations of the RFID devices 102 with respect to the mobile device 104, and transmit the location information according to a communication protocol implemented by the network 106.

The mobile device 104 may be coupled to an antenna array 110. The antenna array 110 may generally be any type of antenna, such as a wire antenna (e.g., a dipole antenna, a loop antenna, a monopole antenna, a helix antenna, etc.), an aperture antenna (e.g., a waveguide, a horn antenna, etc.), a reflector antenna (e.g., a parabolic reflector, a corner reflector, etc.), a lens antenna (e.g., a convex-plane, a concave-plane, a convex-convex, or a concave-concave), a microstrip antenna (e.g., a circular shaped, rectangular shaped, metallic patch, etc.), an array antenna (e.g., a Yagi-Uda antenna, a micro strip patch array, an aperture array, a slotted wave guide array, etc.), or combinations thereof. In some embodiments, there may be 16 antennas in the antenna array 110. In another embodiment, 64 antennas may be included in the antenna array 110. In other embodiments, other numbers of antennas may be used. The mobile device 104 may be configured to manipulate the antenna array 110 for example, by beamforming. Beamforming typically uses a phased antenna array in such a way that signals at particular angles experience constructive interference while signals at other angles experience destructive interference.

The cellular node 108 may be a node in a cellular network that has a known location. For example, the cellular node 108 may be a router, a cellular tower, a computer, or any other type of device with a known location and communicates with the mobile device 104 via the network 106. The cellular node 108 may be configured to receive the relative location information of the RFID devices and the location of the mobile device 104. The cellular node may then calculate the absolute locations of the RFID devices 102 based on the relative locations of the RFID devices 102 and the location of the mobile device 104.

Figure 2:
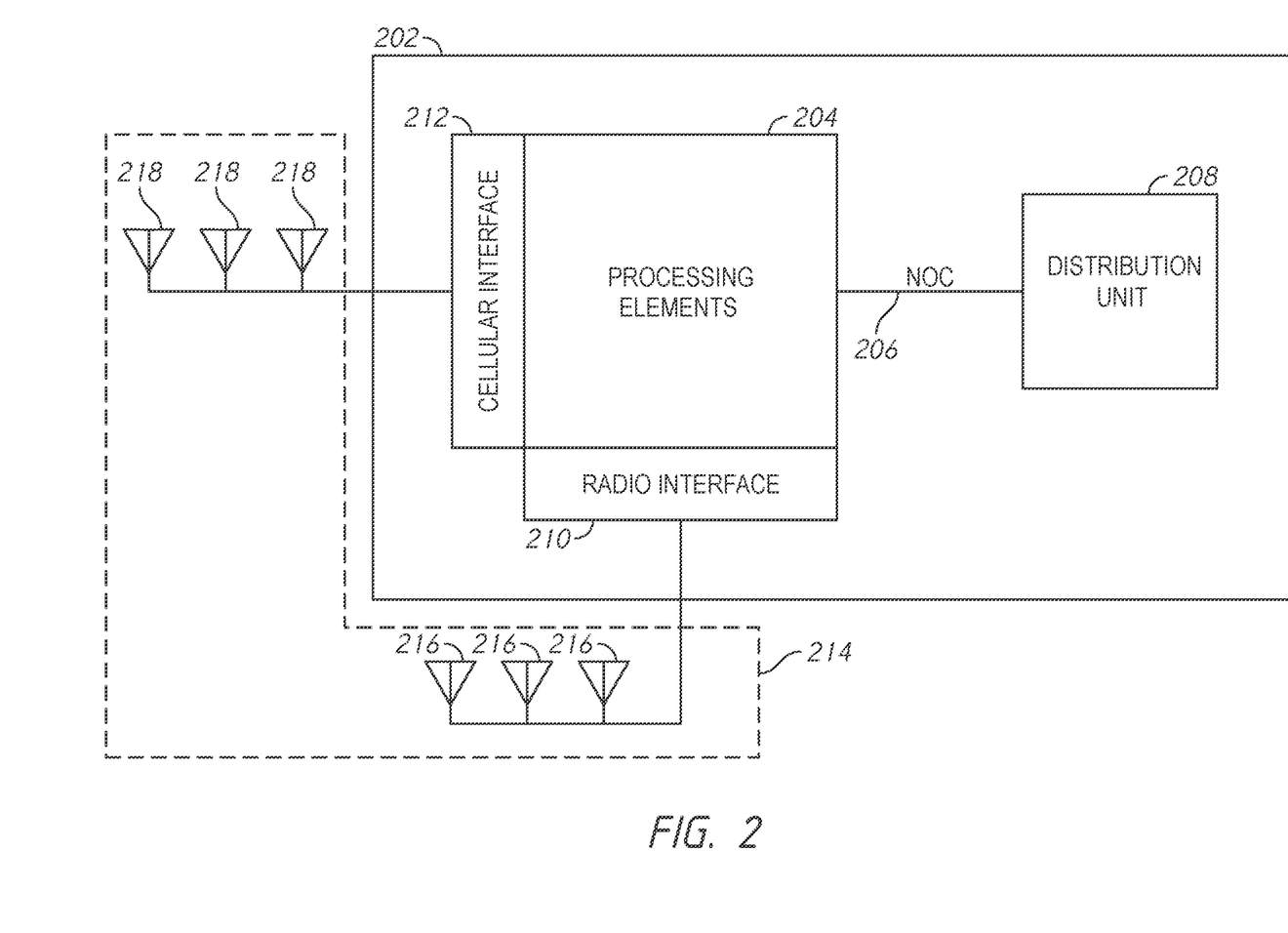
FIG. 2 is a block diagram of an integrated circuit chip included in the mobile device, in accordance with an embodiment of FIG. 1.

FIG. 2 is a block diagram of an integrated circuit chip 202 included in the mobile device 104, in accordance with an embodiment of FIG. 1. The integrated circuit chip 202 is a single chip capable of processing communications signals. Examples of single chip systems include those where circuitry for performing the described tasks are fabricated on and/or into a common substrate generally using semiconductor fabrication techniques. The integrated circuit chip 202 includes a plurality of processing elements 204, a network on chip (NOC) 206, a distribution unit 208, a radio interface 210, and a cellular interface 212. The integrated circuit chip 202 may be coupled to a plurality of antennas 214. The plurality of antennas 214 may include a first set of antennas 216 and a second set of antennas 218. The plurality of antennas 214 may be implemented as the antenna array 110 of FIG. 1.

The processing elements 204 may be implemented using one or more processors, for example, having any number of cores. In some examples, the processing elements 204 may include circuitry, including custom circuitry, and/or firmware for performing functions described herein. For example, circuitry can include a multiplication unit/accumulation units for performing the described functions, as described herein. Processing elements 204 can be any type including but not limited to a microprocessor or a digital signal processor (DSP), or any combination thereof. For example, processing elements 204 can include levels of caching, such as a level one cache and a level two cache, a core, and registers. An example processor core can include an arithmetic logic unit (ALU), a bit manipulation unit, a multiplication unit, an accumulation unit, an adder unit, a look-up table unit, a memory look-up unit, or any combination thereof.

The NOC 206 may be implemented as an on-chip communications sub-system configured to facilitate communication between the processing elements 204 and the distribution unit 208. The NOC 206 may include, for example, one or more links, such as copper wires, connecting the processing elements 204 and the distribution unit 208 and configured to carry information from the processing elements 204 to the distribution unit 208 and vice versa.

The distribution unit 208 may include instructions sets (e.g., one or more program instructions or operations) to be performed by the processing elements 204. For example, the distribution unit 208 may include instructions sets to perform certain logic or arithmetic operations on data, transmit data from one processing element 204 to another processing element 204, or perform other operations. In some embodiments, a first instruction set may be loaded onto a first processing element 204 from the distribution unit 208 and include instructions for a processing element to receive a signal of a first type (e.g., a signal associated with a received radio signal), to process the received signal of a first type to generate a set of data, and to transmit the set of data to a second processing element 204. A second instruction set may be loaded onto a second processing element 204 by the distribution unit 208 and be configured to receive the set of data, process the set of data to generate a second signal of a second type and to transmit the second signal with a plurality of antennas. The distribution unit 208 may be stored on one or more memories, such as a volatile (e.g., dynamic random access memory (DRAM)) or non-volatile memory (e.g., Flash memory). The instructions sets in the distribution unit 208 may be stored in one or more data structures, such as a database.

The radio interface 210 may be coupled to the plurality of antennas 214 and to one or more of the processing elements 204. The radio interface 210 may be configured to receive radio signals detected by the plurality of antennas 214 and convert the received signals into a signal that can be manipulated by the one or more processing elements 204 and route the resulting signal to the one or more processing elements. In some embodiments, radio interface 210 may include an analog to digital converter. In other embodiments, the radio interface 210 may include additional or different components, circuits, etc. Although described as a "radio interface," in some examples, the interface may generally be adapted to convert a received signal of any type to a signal that can be manipulated by the processing elements 204. For example, the radio interface 210 may be configured to receive Wi-Fi signals, optical signals, auditory signals, or any other type of signals. In some embodiments, the radio interface 210 is configured to receive RFID signals detected by the plurality of antennas 214 and to provide the received signals to the one or more processing elements 204.

The cellular interface 212 may be coupled to the plurality of antennas 214 and to one or more of the processing elements 204. The cellular interface 212 may be configured to transmit/receive cellular signals with the plurality of antennas 214 and convert the signals between a signal that can be manipulated by the one or more processing elements 204 and a signal that can be transmitted using the plurality of antennas 214. In some embodiments, cellular interface 212 may include a digital to analog converter. In other embodiments, the cellular interface 212 may include additional or different components, circuits, etc. Although described as a "cellular interface," in some examples, the interface may generally be adapted to any type of signal. A cellular signal may generally refer to any protocol of cellular signal, such as 3G, 4G, 4G LTE, 5G, etc. The cellular interface 212 may be configured to transmit Wi-Fi signals, optical signals, auditory signals, or any other type of signals. In some embodiments, the cellular interface 212 is configured to transmit a different type of signal than the radio interface 210.

In the embodiment of FIG. 2, the plurality of antennas 214 includes a first subset of antennas 216 configured to receive radio signals and to communicate the received signals to the radio interface 210. The plurality of antennas 214 further includes a second subset of antennas 218 configured to communicate over a cellular network. The second subset of antennas 218 may receive signals from the cellular interface 212 and transmit the received signals to one or more cellular nodes (not shown), such as a cellular tower. In various embodiments, the plurality of antennas 214 may be configurable. For example, antennas in the plurality of antennas 214 may be adjustable to receive and/or transmit signals of different types. In such embodiments, the first subset of antennas 216 and the second subset of antennas 218 may be the same antennas. For example, the first subset of antennas 216 may be configured to receive radio signals, such as an RFID signal and to communicate the received radio signal to the processing elements 204 via the radio interface 210. The first subset of antennas 216 may be reconfigured to communicate using a cellular network as the second subset of antennas 218. For example, the plurality of antennas 218 may include or be coupled to an integrated inner mechanism, such as RF switches, varactors, mechanical actuators, or tunable materials, that enable the intentional redistribution of currents over the surface of the antenna to produce modifications of its properties. The processing elements 204 may process the received radio signals according to the instruction sets provided by the distribution unit 208 and communicate a resulting cellular signal to the second subset of antennas 218 via the cellular interface 212. The second subset of antennas 218 may then communicate the received signals via a cellular network.

Note that, by receiving RFID signals, in some examples, an identification layer may be provided by single-chip solutions described herein. For example, the RFID signals received may identify the RFID device from which the signal was received. The identification (ID) may be stored by devices and systems described herein and may be used to track and/or authenticate particular RFID devices and/or RFID-tagged devices in a system. Moreover, metadata about RFID-tagged objects may be stored in a location accessible to devices described herein (e.g. in the cloud or otherwise accessible over the Internet or other network). In this manner, systems described herein may not only detect the object and record its unique ID (e.g. serial number), but an application can look up that RFID tag's metadata and perform additional functions, as appropriate to the nature of the tagged item. Examples described herein may further accordingly provide proximity-triggered applications (e.g. when a particular person or object, identified by an ID obtained from an associated RFID signal, enters a location, a relevant application may be activated).

Figure 3:
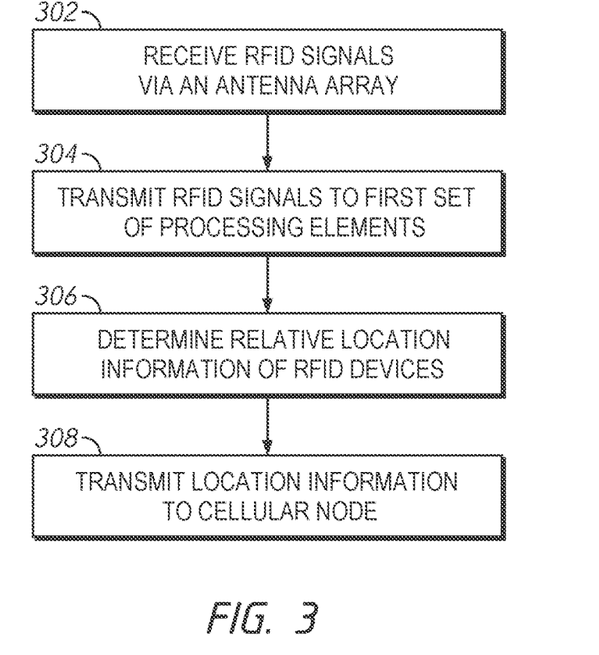
FIG. 3 depicts a method of determining real-time location information for RFID devices, in accordance with an embodiment of the present invention.

FIG. 3 depicts a method of determining real-time location information for RFID devices, in accordance with an embodiment of the present invention. In operation 302, the mobile device 104 receives RFID signals from the RFID devices 102 via the antenna array 110. The mobile device 104 may manipulate the antenna array 110 using beamforming to direct the antenna array to scan over an area to determine the relative directions to the RFID devices 102. The mobile device 104 may manipulate the antenna array 110 by manipulating one or more coefficients, where the coefficients correspond to a particular angle at which the antenna array 110 is focused. By manipulating the coefficients, the direction in which the antenna array 110 is focused may be altered to determine from which directions the ID signals from the RFID devices 102 are the strongest. Because each antenna in the antenna array 110 detects the ID signal from each RFID device 102 from a slightly different angle, directional information from a plurality of different angles is detected by the mobile device 104, which can then be used to triangulate the precise locations of the RFID devices 102.

In operation 304, the mobile device 104 transmits the received RFID signals to a first set of processing elements, such as one or more of the processing elements 204 of FIG. 2. For example, the RFID signals may be received by one or more of the plurality of antennas 214 and transmitted to the radio interface 210. The radio interface 210 may then convey the received signals to one or more of the processing elements 204 to be processed according to an instruction set provided by the distribution unit 208.

In operation 306, the mobile device 104 determines relative location information of the RFID devices 102. With reference to FIG. 2, a an instruction set instruction set may be loaded into the first set of processing elements 204 by the distribution unit 208 to process the received ID signals and determine the relative locations of the RFID devices 102. As discussed above, each antenna in the antenna array 110 detects the ID signals of the RFID devices 102 from a different angle. Based on the measured angles from which the ID signals are measured and the known distance between the antennas detecting the ID signals, the distance and direction to an emitting RFID device 102 can be determined using geometry, such as the law of sines.

In operation 308, the mobile device 104 transmits the location information to the cellular node 108. The instruction set that the first set of processing elements are executing may include instructions to transmit the relative location information to a second set of processing elements 204 executing a second processing element instruction set. The second processing element instruction set may include instructions for the second set of processing elements 204 to convert the received location information into a format for transmission over the network 106 to the cellular node 108. For example, the second set of processing elements 204 may convert the relative location information into one or more data packets and transmit the one or more data packets to the second set of antennas 218 to be transmitted to the cellular node 108 via the network 106.

Once the cellular node 108 receives the relative location information of the RFID devices 102, any number of operations may be performed to further process the received information and/or initiate future operations based on the received location information. For example, the cellular node 108 may derive the absolute locations of the RFID devices 102, calculate the location direction of travel of the mobile device 104, and/or predict the destination of the mobile device 104. Other/additional data processing steps may also be performed.

Figure 4:
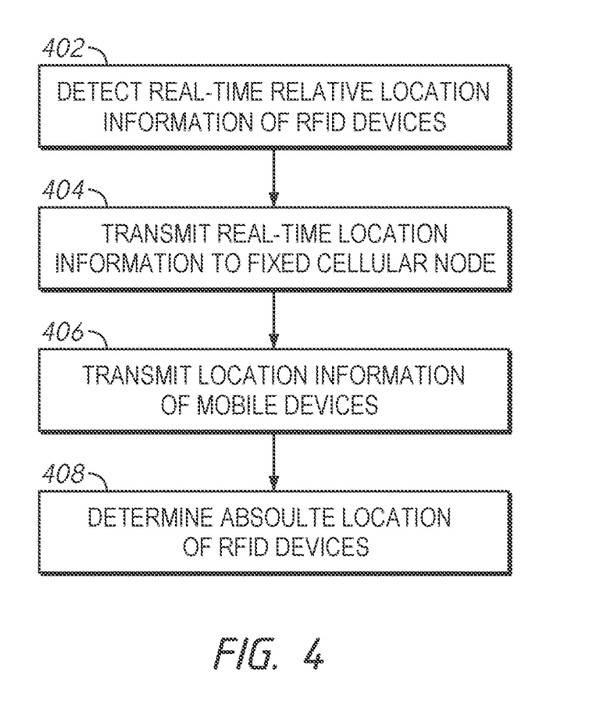
FIG. 4 depicts a method of determining absolute location information for RFID devices, in accordance with an embodiment of the present invention.

FIG. 4 depicts a method of determining absolute location information for RFID devices, in accordance with an embodiment of the present invention.

In operation 402, the mobile device 104 detects real-time relative location information of the RFID devices 102. The detection and determination of the relative location information of the RFID devices 102 may be determined as described above with respect to operations 302-306 of FIG. 3. In operation 402, the mobile device 104 transmits the real-time location information to the fixed cellular node 108. The real-time location information may be transmitted to the cellular node 108 as described above with respect to operation 308 of FIG. 3.

In operation 406, the mobile device 104 transmits location information for the mobile device 104 to the fixed cellular node 108. The mobile device 104 may include one or more devices for determining the location of the mobile device 104 relative to the fixed cellular node. For example, the mobile device 104 may include a global positioning system, an accelerometer, or any other device for determining the location of the mobile device 104 relative to the cellular node 108. In another embodiment, the cellular node 108 may detect the location of the mobile device 104 in a manner similar to the method described in FIG. 3 for detecting the locations of the RFID devices 102. In such an embodiment, the cellular node 108 may include an antenna array that detects signals from the mobile device 104. The antenna array and the cellular node 108 may determine the location of the mobile device 104 in the same manner that the mobile device 104 determines the location of the RFID devices 102 as described above with respect to FIG. 3.

In operation 408, the cellular node 108 determines the absolute locations of the RFID devices 102. The cellular node 108 may determine the absolute location of the RFID devices 102 by combining the location information for the mobile device 104 and the relative location information for the RFID devices 102. For example, the cellular node 108 can determine the distance and direction to the mobile device 104 using the location information for the mobile device 104 received in operation 406. The cellular node 108 can then use vector addition to combine the distance and direction to the mobile device 104 with the relative distance and direction to the RFID devices 102 as determined by the mobile device 104 and received by the cellular node 108 in operation 404. If the absolute location of the cellular node is known, then the absolute, real-time locations of the RFID devices 102 are determinable using the vector addition method described above. Additionally or instead, real-time locations of the RFID devices 102 may be determined using received signal strength (RSS) information, which may be present in an RFID system.

In some examples, inventory systems may benefit from determining the absolute locations of RFID devices 102. For example, a warehouse may have a cellular or Wi-Fi node, such as a router, at a fixed location, such as attached to the ceiling of the warehouse. Inventory items may be outfitted with RFID tags. A worker may walk through the warehouse with a mobile device that is configured to detect the identities and relative locations of the inventory items based on the RFID tags. This information may then be communicated to the fixed cellular node along with the location information of the mobile device. The cellular node, or a computer attached thereto may then determine the identity and location of each inventory item in the warehouse without the need for individually recording or scanning the inventory items by hand.

In another scenario, a consumer may have a mobile device and may be walking through a store. The mobile device may be programmed to detect the identities and/or relative locations of inventory items in the store based on RFID tags on or proximate the items. As the consumer gathers items for purchase (e.g. places them in a cart and/or begins to carry them), the mobile device may identify those items as prospective purchase items as their location may change together with the mobile device as they move together through the store (e.g. their location relative to the mobile device may become more fixed, even as the mobile device moves). When the mobile device departs the store, the information may be communicated to a fixed cellular node along with the identity of the prospective purchase items, and an account associated with the consumer may be charged an amount equal to a purchase price of the prospective purchase items.

Figure 5:
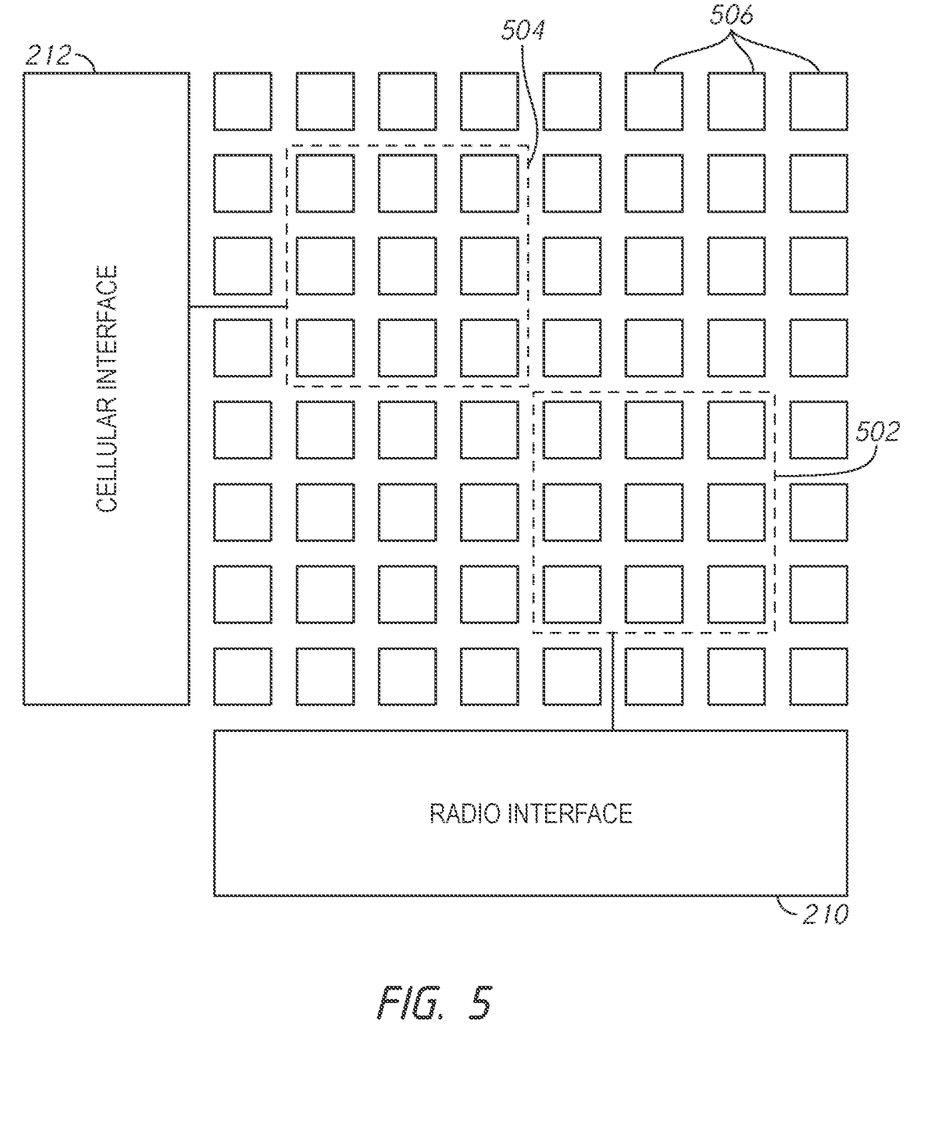
FIG. 5 is a block diagram of a plurality of processing elements and communication interfaces, in accordance with an embodiment of the present invention.

FIG. 5 is a block diagram of a plurality of clusters 506, processing elements 204, a radio interface 210, and a cellular interface 212, in accordance with an embodiment of the present invention. The clusters 506 of processing elements 204, the radio interface 210, and the cellular interface 212 may be implemented as described above with respect to FIG. 2. As shown in FIG. 5, some of the clusters 506 may be grouped into one or more sets. For example, a first number of clusters 506 may be grouped into a first set 502 and a second number of clusters 506 may be grouped into a second set 504. Each of the clusters 506 in the first set 502 may be coupled to the radio interface 210, and the radio interface may route received signals to the clusters 506 in the first set 502. Each of the processing elements 204 in the clusters 506 may have a first instruction set loaded thereon and may process signals received from the radio interface 210 according to the first instruction set. The clusters 506 of the first set 502 may transmit processed signals to the clusters 506 of the second set 504 via one or more switches.

Each of the processing elements 204 of the clusters 506 of the second set 504 may have a second instruction set loaded thereon and process the received signals according to the second instruction set to generate signals of a second type. The clusters 506 of the second set 504 may be coupled to the cellular interface 212 and may transfer the signals of the second type to the cellular interface 212 to be transmitted via a plurality of antennas (not shown).

Although each of the first set 502 and the second set 504 are shown as including nine clusters 506, greater or fewer clusters 506 may be dynamically added or subtracted from the first set 502 and/or the second set 504 based on system demands. For example, if the number of radio signals received by the antennas and transmitted to the radio interface 210 increases, additional clusters 506 may be added to the first set 502 to handle the increased processing load.

Figure 6:
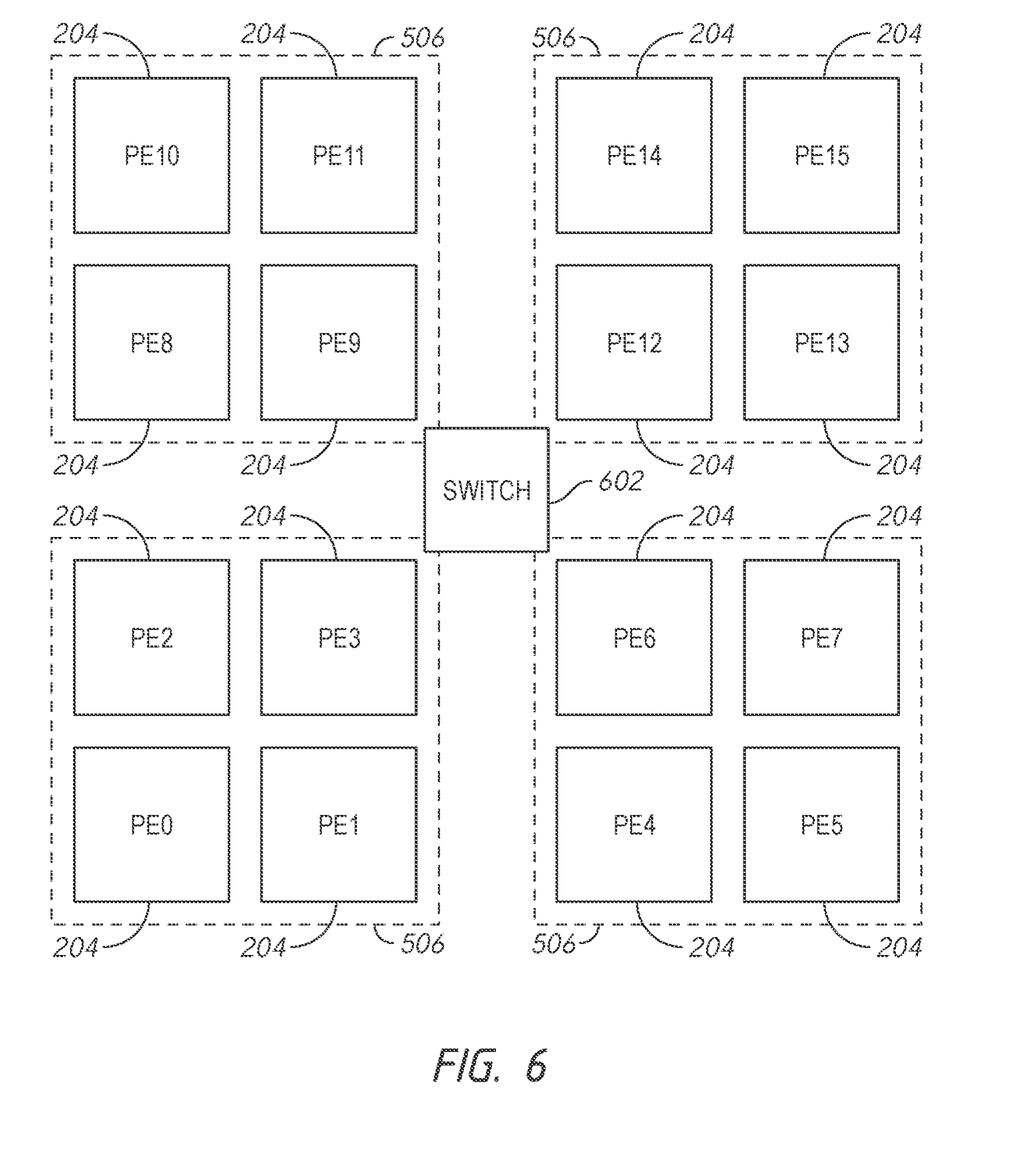
FIG. 6 is a block diagram of a plurality of processing elements, in accordance with an embodiment of the present invention.

FIG. 6 is a block diagram of a plurality of clusters 506 coupled through a switch 602, in accordance with an embodiment of the present invention. In the embodiment of FIG. 6, each cluster 506 includes four processing elements 204. Each processing element 204 of a given cluster 506 may communicate directly with another processing element 204 within that same cluster 506. For example, each of the processing elements PE0-3 can directly communicate with one another. Similarly, processing elements PE4-7 can communicate directly, as can processing elements PE8-11 and PE12-15. Processing elements 204 of different clusters 506 may communicate with one another via a switch 602 based on instructions in whatever instruction set is loaded for a given processing element 204. For example, the processing element PE14 may transmit a signal to the switch 602 with an instruction that the signal should be routed to the processing element PE1. The switch may route the signal directly to the processing element PE1 or the switch may route the signal to another processing element in the same cluster as PE1 (e.g., processing elements PE0, PE2, or PE3), which then route the received signal to processing element PE1. By linking clusters of processing elements together in this manner, greater or fewer clusters 506 may be added simply by changing the instruction sets that are loaded for a set of processing elements.

Figure 7:
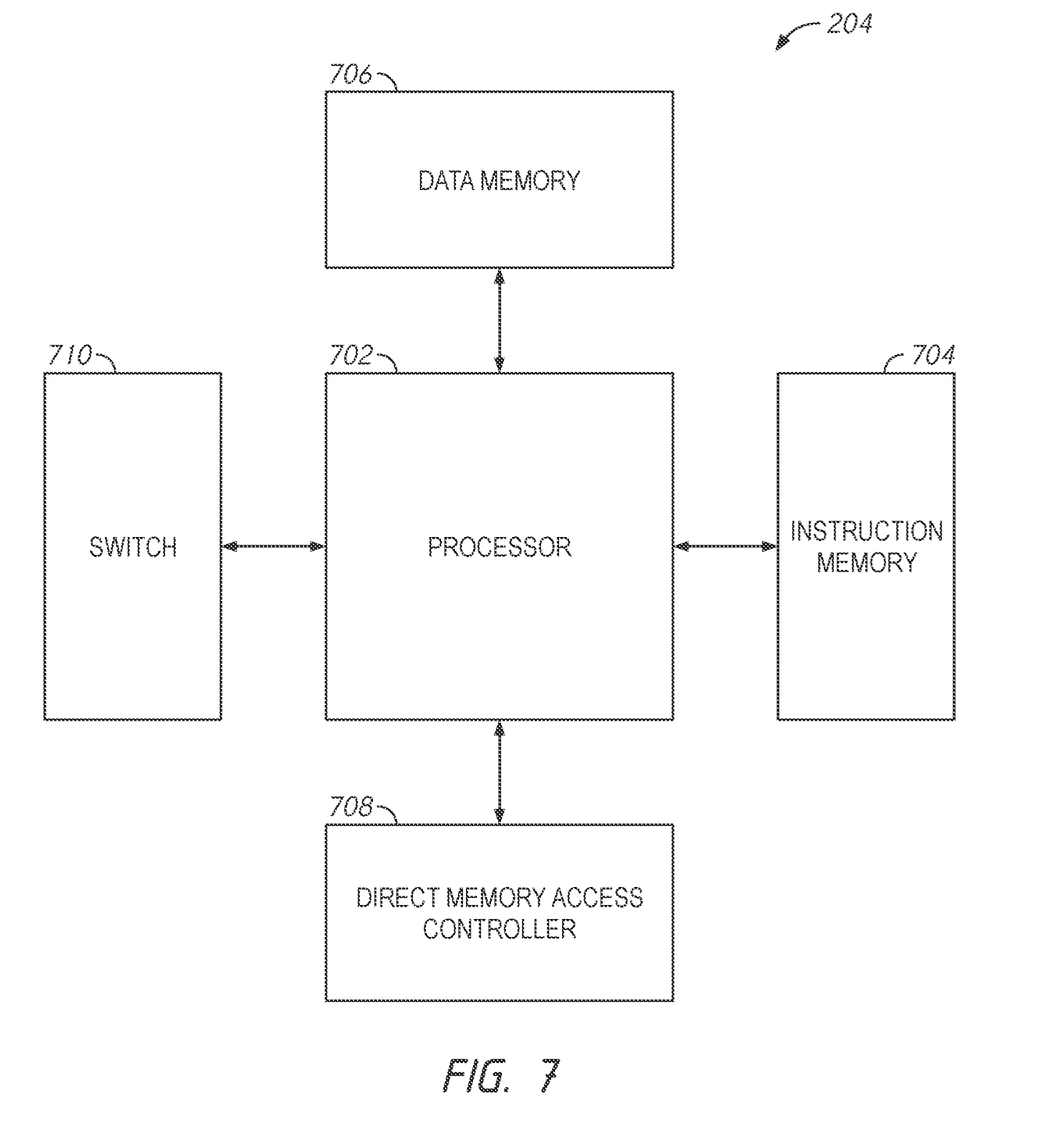
FIG. 7 is a block diagram of a processing element, in accordance with an embodiment of the present invention.

FIG. 7 is a block diagram of a processing element 204, in accordance with an embodiment of the present invention. The processing element 204 generally includes a processor 702 coupled to an instruction memory 704, a data memory 706, a direct memory access controller 708, and a switch 710.

The processor 702 may include, for example, a number of processing cores. In some examples, the processor 702 may include circuitry, including custom circuitry, and/or firmware for performing functions described herein. For example, circuitry can include multiplication units/accumulation units for performing operations described herein. The processor 702 may be, for example, a microprocessor or a digital signal processor (DSP), or any combination thereof. An example processor core can include an arithmetic logic unit (ALU), a bit manipulation unit, a multiplication unit, an accumulation unit, an adder unit, a look-up table unit, a memory look-up unit, or any combination thereof. The instruction memory 704 is a memory device configured to store an instruction set. The instruction memory 704 may generally be any type of memory. For example, the instruction memory 704 may be a volatile memory, such as dynamic random access memory, or non-volatile memory, such as flash memory. The data memory 704 is a memory device configured to store received data, such as the data included in the signals received and/or transmitted from the plurality of antennas 214. The data memory 706 may generally be any type of memory. For example, the data memory 706 may be a volatile memory, such as dynamic random access memory, or non-volatile memory, such as flash memory. The direct memory access controller includes control circuitry for the processor 702 to access the instruction memory 704 and the data memory 706. The switch 710 routes data from one processing element 204 to another processing element 204. For example, the switch 710 may route data from one processing element 204 to another processing element 204 within a single cluster 506. The switch may generally be any type of switching fabric.

In operation, an instruction set may be loaded into and stored in the instruction memory 704. Data in the form of the received signals are stored in the data memory 706. The processor 702 processes the data in the data memory 706 in accordance with the instruction set stored in the instruction memory 704. For example, the processor 702 may perform arithmetic operations, convert the data from one format to another, or perform any other type of operations. The direct memory access controller 708 may control access of the processor 702 to the instruction memory 704 and/or the data memory 706. The processor 702 may transfer processed data to one or more other processing elements 204 via the switch 710.

Those of ordinary skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Skilled artisans may implement the described functionality in varying ways for each particular application, but such implementation decisions should not be interpreted as causing a departure from the scope of the present disclosure.

What is claimed is:

1. A method comprising:
   detecting, by a plurality of antennas, a plurality of identifier signals of a first signal type associated with a respective plurality of remote devices;
   determining, by a first plurality of processing elements on an integrated circuit chip, respective location information of the plurality of remote devices relative to the integrated circuit chip;
   processing, by a second plurality of processing elements on the integrated circuit chip, the respective location information for communication via a network configured to convey signals of a second signal type;
   transmitting the processed location information via the network;
   converting the respective location information of the plurality of remote devices relative to the integrated circuit chip into information packets, wherein the information packets are formatted for transmission as part of the signals of the second signal type; and
   transmitting the signals of the second signal type comprising the processed location information to a cellular node via the network.

2. The method of claim 1, further comprising reconfiguring, by a processing element on the integrated circuit chip, an antenna of the plurality of antennas to transmit the processed location information via the network.

3. The method of claim 1, wherein the network is a cellular network.

4. The method of claim 1, wherein the network is a Wi-Fi network.

5. The method of claim 1, wherein the plurality of identifier signals are radio frequency identification tags.

6. The method of claim 1, further comprising:
   determining a location of the integrated circuit chip relative to a reference point; and
   determining respective location information of the plurality remote devices relative to the reference point based, at least in part, on the location of the integrated circuit chip relative to the reference point and the respective location information of the plurality of remote devices relative to the integrated circuit chip.

7. A method comprising:
   detecting, by a plurality of antennas, a plurality of identifier signals of a first signal type associated with a respective plurality of remote devices;
   determining, by a first plurality of processing elements on an integrated circuit chip, respective location information of the plurality of remote devices relative to the integrated circuit chip;
   processing, by a second plurality of processing elements on the integrated circuit chip, the respective location information for communication via a network configured to convey signals of a second signal type; and
   transmitting the processed location information via the network, wherein the plurality of identifier signals comprise identities of a plurality of inventory items, wherein each of the inventory items is tagged with a respective RFID tag;
   wherein determining respective location information comprises determining that the inventory items are outside a predetermined perimeter; and
   charging an account associated with a device including the integrated circuit chip an amount associated with the plurality of inventory items responsive to determining that the inventory items are outside the predetermined perimeter.

8. An apparatus comprising:
   a plurality of antennas of a mobile device configured to detect a plurality of identifier signals of a first signal type associated with a respective plurality of remote devices;
   an integrated circuit chip implemented on the mobile device, the integrated circuit chip comprises:
      a first plurality of processing elements configured to determine respective location information of the plurality of remote devices relative to the integrated circuit chip; and
      a second plurality of processing elements configured to:
         process the respective location information for communication via a network configured to convey a signal of a second signal type;
         convert the respective location information of the remote devices relative to the integrated circuit chip into information packets, wherein the information packets are formatted for transmission as part of the signals of the second signal type; and
         transmit the signals of the second signal type comprising the processed location information to a cellular node via the network; and
   the network configured to transmit the processed respective location information.

9. The apparatus of claim 8, wherein the integrated circuit chip further comprises:
   a distribution memory; and a network on chip (NOC) configured to carry information between the distribution memory and the first and second pluralities of processing elements.

10. An apparatus comprising:
a plurality of antennas of a mobile device configured to detect a plurality of identifier signals of a first signal type associated with a respective plurality of remote devices;
an integrated circuit chip implemented on the mobile device, the integrated circuit chip comprises:
   a first plurality of processing elements configured to determine respective location information of the plurality of remote devices relative to the integrated circuit chip;
   a second plurality of processing elements configured to process the respective location information for communication via a network configured to convey a signal of a second signal type;
   a distribution memory; and
   a network on chip (NOC) configured to carry information between the distribution memory and the first and second pluralities of processing elements; and
the network configured to transmit the processed respective location information, wherein the distribution memory is configured to store instruction sets to be performed by the first and second plurality of processing elements, wherein a first instruction set of the instruction sets is loaded onto the first plurality of processing elements from the distribution memory, and wherein the first instruction set includes instructions to:
receive a signal of the first signal type;
process the received signal to generate a set of data; and
transmit the set of data to the second plurality of processing elements.

11. The apparatus of claim 10, wherein a second instruction set of the instruction sets is loaded onto the second plurality of processing elements from the distribution memory, and wherein the second instruction set includes instructions to:
receive the set of data;
process the set of data to generate a signal of the second signal type; and
transmit the signal of the second signal type.

12. An apparatus comprising:
a plurality of antennas of a mobile device configured to detect a plurality of identifier signals of a first signal type associated with a respective plurality of remote devices;
an integrated circuit chip implemented on the mobile device, the integrated circuit chip comprises:
   a first plurality of processing elements configured to determine respective location information of the plurality of remote devices relative to the integrated circuit chip;
   a second plurality of processing elements configured to process the respective location information for communication via a network configured to convey a signal of a second signal type;
   a first interface coupled to the plurality of antennas and the first plurality of processing elements, wherein the first interface is configured to receive the plurality of identifier signals of the first signal type detected by the plurality of antennas and convert the received plurality of identifier signals into a signal configured to be manipulated by the first and second pluralities of processing elements; and
   a second interface coupled to the plurality of antennas and the second plurality of processing elements, wherein the second interface is configured to transmit or receive the signal of the second signal type with the plurality of antennas; and
the network configured to transmit the processed respective location information.

13. The apparatus of claim 12, wherein the first interface comprises an analog to digital converter and the second interface comprises a digital to analog converter.

14. The apparatus of claim 12, wherein the plurality of antennas includes a first subset of antennas configured to receive the plurality of identifier signals of the first signal type and communicate the received signals to the first interface and a second subset of antennas configured to receive signals from the second interface and transmit the received signals to a cellular node.

15. A method comprising:
detecting a plurality of signals of a first signal type;
determining, by a first plurality of processing elements on an integrated circuit chip implemented on a mobile device, respective location information of a plurality of remote devices relative to the integrated circuit chip;
converting, by a second plurality of processing elements on the integrated circuit chip, the respective location information of the plurality of remote devices relative to the integrated circuit chip into a plurality of signals of a second signal type;
calculating respective location information of the plurality of remote devices based on the signals of the second signal type comprising relative location information of the plurality remote devices and a location of the integrated circuit chip, wherein detecting the plurality of signals of the first signal type comprises detecting the plurality of signals of the first signal type based on a plurality of angles, each angle of the plurality of angles associated with a respective antenna of an antenna array comprising a plurality of antennas.

16. The method of claim 15, further comprising:
manipulating the antenna array to scan the plurality of remote devices to determine a relative direction to each remote device of the plurality of remote devices based partly on the plurality of angles associated with each antenna of the antenna array.

17. The method of claim 15, further comprising predicting a destination of a mobile device comprising the integrated circuit chip.

18. The method of claim 15, further comprising:
loading a first instruction set into the first plurality of processing to process the detected plurality of signals;
loading a second instruction set into the second plurality of processing elements to process data including the respective relative locations of the plurality of remote devices and generate the signal of the second signal type.

* * * * *